Nov. 6, 1934.                F. MARGUERRE                 1,979,393
                    THERMODYNAMIC ENERGY STORAGE METHOD
                    Filed April 12, 1933    2 Sheets-Sheet 1
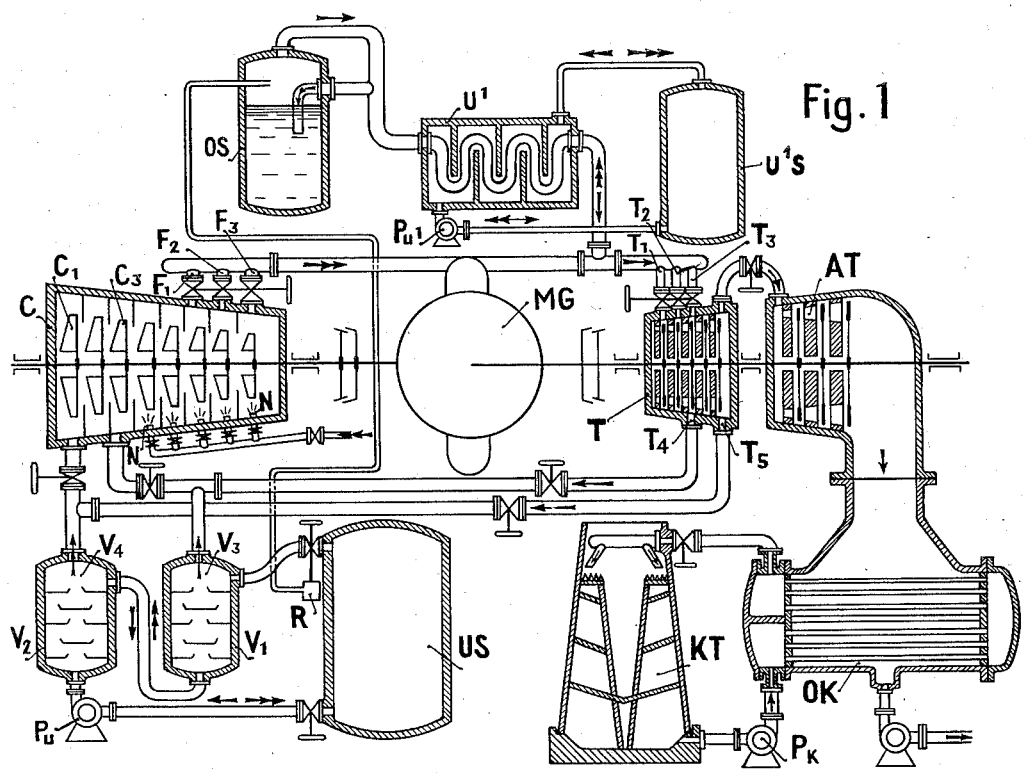
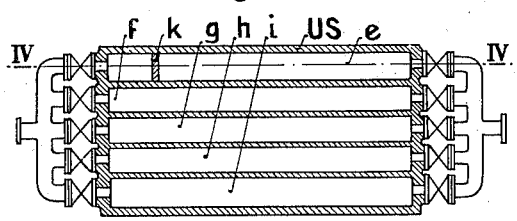
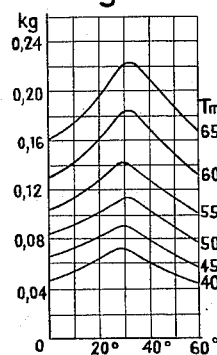
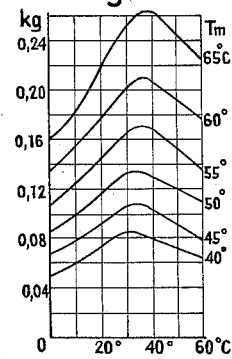
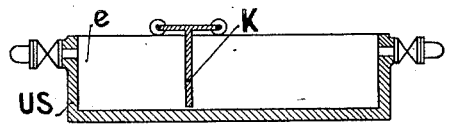
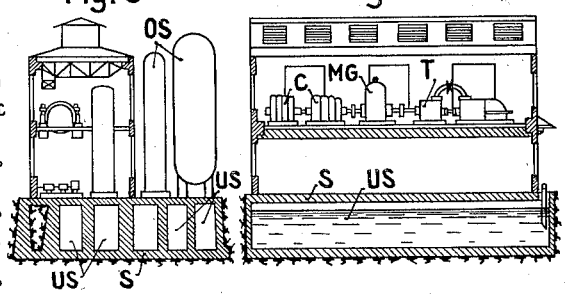

Nov. 6, 1934.  F. MARGUERRE  1,979,393
THERMODYNAMIC ENERGY STORAGE METHOD
Filed April 12, 1933   2 Sheets-Sheet 2

Inventor
Fritz Marguerre
By Sommers & Young attys

Patented Nov. 6, 1934

1,979,393

UNITED STATES PATENT OFFICE 1,979,393

THERMODYNAMIC ENERGY STORAGE METHOD

Fritz Marguerre, Mannheim, Germany

Application April 12, 1933, Serial No. 665,784
In Germany April 15, 1932

13 Claims. (Cl. 60—92)

This invention relates to the thermodynamic storage and utiliaztion of energy by means of a heat pump, a prime mover and lower and upper accumulators filled with water. In plants for carrying out the method for storing and utilizing energy by the means referred to, considerations of economy make it compulsory to make the difference between the temperatures of the charged and discharged states of each of the accumulator great, so as to be able to keep within economically tolerable original costs. The result of this is that the heat drop for the heat pump and the prime mover, which has to be considered, is subjected, during the course of the charging and discharging operations, to great variations, from which it follows again that on the one hand, if a uniform output is to be maintained, greatly varying quantities and volumes of steam are necessary, which is unfavourable for the dimensioning of the engines used, namely the heat pump and prime mover, and, on the other hand, the efficiency of the whole method is impaired.

The object of the present invention is therefore to provide a method of working in which the disadvantages above referred to, do not arise. This is achieved according to the present invention firstly by superheating the steam in and issuing from the heat pump and storing separately the superheat thus produced. By regulating or acting on the quantity and/or the temperature of the water (accumulator and cooling water) necessary for carrying out the method, the degree of superheat generated in the heat pump as also the power absorbed by it may be controlled. Furthermore, the heat produced in consequence of unavoidable losses of energy in carrying out the process (such losses being due to friction, increase of entropy and the like) may be eliminated from the process at a temperature which is lower than the highest one which the water in the lower accumulator may reach.

By regulating the quantity and/or temperature of the water necessary for carrying out the method as above set forth, the possibility is afforded of regulating the amount of power absorbed and given off by the whole plant within wide limits, and practically without loss, thus improving the total efficiency of the method to be carried out.

Various plants for carrying out the new method are diagrammatically illustrated in the accompanying drawings, wherein:

Fig. 1 shows diagrammatically a plant in which the lower accumulator is constructed as a displacement accumulator and the upper accumulator as a drop accumulator, while the superheat accumulator is worked on the displacement principle.

Figs. 3 and 4 show a construction of the lower accumulator in a flat form with separate single compartments, Fig. 4 being a section on the line IV—IV of Fig. 3.

Figs. 5 and 6 show the lower accumulator as housed in the foundations of the entire plant.

Figs. 9 and 10 are diagrams showing the result of regulating the contents of the lower accumulator to suit the weight of steam which a compressor is capable of absorbing under various mean suction temperatures and multistage intake.

Figure 2:
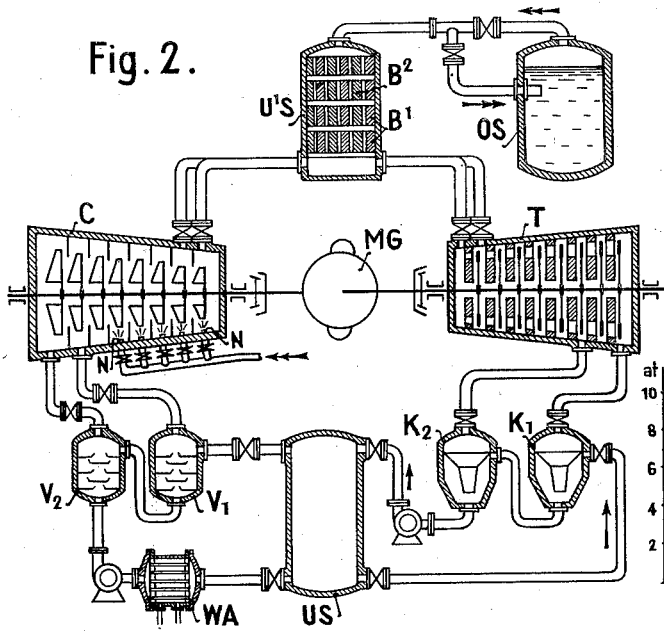
Fig. 2 shows a similar plant comprising an accumulator for storing up superheat filled with appropriate solid bodies and a heat exchanger for carrying off the heat produced by the losses of energy inherent to the process carried out in the plant.

Before any explanation of the new method is proceeded with, it may be here stated that by an accumulator worked on the displacement principle (i.e. a constant pressure accumulator) is meant an accumulator in the charging of which, the contents cooled down from the previous withdrawal of steam therefrom are taken off at the lower end of the accumulator and after passing through a heat exchanging apparatus in which they are heated up, are returned at the same pressure to the same accumulator at the upper end thereof. In order to make up the unavoidable losses due to friction, a circulating device must be provided in this case at some point in the cycle. If the withdrawal and return of the water be effected under these circumstances in such a way that the formation of large eddies at the outlet and inlet points is avoided, mixture of cold and hot liquid will be avoided, and in the same proportions as the cold liquid is withdrawn at the bottom, the heated liquid will be admitted at the top, while the intermediate layer of liquid between the two liquid contents of the accumulator of different temperatures will be forced from the top downwards as charging proceeds. When the accumulator is discharged, the cycle will naturally take place in the reverse order, so that the intermediate layer will be forced from the bottom towards the top.

By a drop accumulator on the other hand, is meant an accumulator in which the pressure and temperature increase continuously during charging while they continuously decrease during discharging.

In the plant shown diagrammatically in Fig. 1 for carrying out the new method, the direction in which the working media flow when charging, is indicated by a double arrow (←←) and when discharging, by a single arrow (←). US denotes a lower accumulator worked on the displacement principle and the contents of which are circulated by means of a pump $P_u$ through devices $V_1$, $V_2$, which act alternately as evaporators and condensers. OS denotes an upper accumulator worked on the drop principle. During the charging of the upper accumulator OS, during which time, the lower accumulator US is discharging, the contents of the latter cool down in stages in the devices $V_1$, $V_2$, which are connected up in series. The steam spaces $V_3$, $V_4$ of these devices $V_1$ and $V_2$ respectively, are connected to different pressure stages $C_3$ and $C_1$ respectively, of a heat pump C constructed in the form of a centrifugal compressor. The compressor C is at this time in driving connection with an electrical machine MG, which is adapted to function alternating as a motor and generator. Owing to the reduction in pressure produced by the compressor C in the devices $V_1$, $V_2$ a part of the water flowing through these devices is evaporated, without any heat from an external source being supplied, the evaporating heat required for the evaporation of said part of water being taken from the rest of the water flowing through said devices $V_1$, $V_2$. The steam absorbed by the centrifugal compressor C and raised by it to a higher pressure and a higher temperature, is delivered into an upper accumulator OS in which it is condensed. In order to adapt the delivery pressure of the compressor C to the increase of pressure occurring in the upper accumulator OS while the latter is charged, said compressor is provided with a number of outlets controlled by manually operated valves $F_1$, $F_2$, $F_3$, said outlets coming into use successively with the increasing pressure in said accumulator. The steam gives up its superheat generated in the compressor C in a heat exchanging apparatus U' to the liquid contents of a superheating accumulator U'S. This latter is worked on the displacement principle, a pump $P_u$, serving to circulate its contents. T denotes a prime mover constructed in the form of a steam turbine and in which the steam taken from the upper accumulator OS when discharging, is used for the production of energy, the electrical machine MG functioning in such case as a generator. The turbine T is provided with a number of inlets $T_1$, $T_2$, $T_3$ which are added-in successively as the pressure of the upper accumulator decreases. Before it enters the turbine T, the steam issuing from the upper accumulator OS is superheated in the heat exchanger U', the superheat stored up during the charging in the superheating accumulator U'S being thus used.

Exhaust steam at different pressures is taken from the turbine T at two points $T_4$, $T_5$ and then passes into the devices $V_1$, $V_2$. These devices work during this time as condensers, the cold water from the lower accumulator US, circulated by the pump $P_u$, condensing the steam which enters them, and becoming itself heated up again by stages. A small portion of the steam taken from the upper accumulator OS is expanded down in a part AT appended to the turbine T to a temperature which is lower than that of the condensers $V_1$, $V_2$, that is to say, is lower than the highest temperature of the lower accumulator. This expansion is rendered possible by a further condenser OK, the cooling water of which is circulated by a pump $P_k$ and gives up exhaust heat to the surrounding neighbourhood in a cooling tower KT.

The steam issues from the compressor C (heat pump) in a superheated state. Its temperature may be regulated by means of water injected through nozzles N in a finely distributed manner into the steam whilst the latter is compressed. By means of this regulation it is possible to charge the superheating accumulator in such a way, that during the discharging period a variation of the degree of superheat is obtained which may be fixed in advance.

Owing to the superheating heat imparted to the steam in the compressor C being stored up in a separate accumulator U'S independently of the heat of evaporation accumulated in the accumulator OS, it is possible to ensure, firstly, that in consequence of the increase produced by this means in the total drop worked through in the engines (compressor and turbine), the relative difference in these drops between the beginning and ending of the charging and discharging periods, is reduced. Furthermore, by the very fact that superheating heat is generated in the compressor and then stored up separately, the efficiency of the whole method is improved, because firstly, by being stored at a higher temperature, the energy converted into heat due to loss within the compressor, is available during the discharging period of the upper accumulator with a larger drop and can thus be utilized again with a better thermal degree of efficiency in the turbine, and secondly, by using superheated steam, the thermodynamic efficiency of the turbine is increased in the well known way.

In the plant shown in Fig. 1, the superheating heat is stored in the accumulator U'S with the help of a liquid of high boiling point. When dealing with very high steam temperatures, the superheat may be accumulated in and withdrawn from a superheating accumulator U'S by passing the steam on surfaces of appropriate solid bodies $B^1$, $B^2$ stored up in the said accumulator U'S as shown in Fig. 2. Metals or ceramic substances for example, may conveniently be used as such solid bodies.

Figure 8:
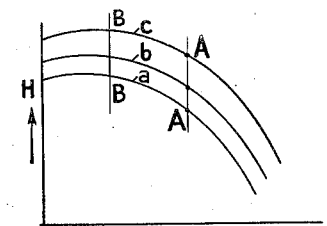
Fig. 8 shows in a pressure-volume-diagram H—Q characteristics of centrifugal compressors having different numbers of stages.

It has already been stated in the introduction to this specification that in plants for the thermodynamic storage and utilization of energy, considerations of economy render it desirable to make the differences between the temperatures of the charged and discharged upper accumulator OS large, as in such a case the quantity of steam, which is evaporated out of each kg. of water contained in the upper accumulator, increases. For the construction of the upper accumulator as a drop accumulator, as is the case by way of example in the arrangement shown in Fig. 1, this demands a large difference of pressure between the charged and discharged states. In order to avoid in this case greater losses in the charging steam by throttling, the pressure of the steam issuing from the compressor C should adapt itself as much as possible to the fluctuations of the pressure in the upper accumulator OS. Thus in order to comply with these requirements, the multistage compressor C which is required under these circumstances, must, as shown, be provided with a number of outlets controlled by manually operated valves $F_1$, $F_2$, $F_3$. These outlets are successively put in use, as the pressure in the upper accumulator OS increases in such a way that the pressure of the steam issuing from the compressor is always greater by just the unavoidable fall of pressure in the pipe connections than the pressure in the upper accumulator at the particular moment. The compressor then works in accordance with the increasing back or counter pressure in the upper accumulator, on various characteristics. Fig. 8 shows three such characteristics $a$, $b$, $c$ in a pressure-volume-diagram H—Q, these characteristics corresponding to different numbers of working wheels of the compressor. In this Fig. 8 A are points of best efficiency while B denotes the surging limits. The number of revolutions of the compressor however remains unaltered under these conditions, as the compressor is driven as a rule by a three phase alternator or induction motor.

As all the characteristics referred to run very steeply, owing to the multistage construction of the compressor, only slight alterations in the volume drawn in by the compressor take place under unchanged drawing-in condition, notwithstanding great fluctuations in the pressure in the upper accumulator, so that the amount of power absorbed by the compressor increases greatly as the back or counter pressure in the upper accumulator increases. This phenomenon is undesirable in view of the variable loading conditions of the power distributing system (mains) which supplies the energy for driving the compressor. In order however to counteract this disadvantage, according to this invention, the amount of power absorbed by the heat pump C is regulated by varying the quantity and/or temperature of the water in the lower accumulator, without however thereby adversely affecting the efficiency of the heat pump. In this case, these measures may be employed with or without the above-mentioned shifting of the compressor connections.

A regulation of this kind of the amount of power absorbed by the compressor C can effectively be brought about as described hereinafter by reducing the temperatures of the steam drawn in through the inlet stage or stages of the compressor during the charging period of the upper accumulator, as the back or counter pressure arises in the latter. In this way the specific gravity of the currents of steam drawn in, the total volume of which, as already stated above, varies but little, will be greatly reduced, the result of which is that the power absorbed by the compressor decreases notwithstanding the total heat drop, which has to be overcome by the compressor, is slightly increased thereby.

A step by step lowering of the temperatures of the steam drawn into the compressor for the purpose mentioned, may be effected for example by circulating the contents of the lower accumulator by means of the pump $P_u$ several times through the evaporators $V_1$, $V_2$ during the charging period, with the result that the temperatures inside the evaporators $V_1$, $V_2$ connected in series with the lower accumulator US, decrease in stages with each circulation. While the turbine is being driven, the contents of the lower accumulator may be circulated one or more times independently of the mode of driving, during the charging period.

Another method of varying the temperatures of the steam drawn into the compressor C out of the evaporators $V_1$, $V_2$ is to supply the first evaporator $V_1$, that is, the hottest evaporator, with water of varying temperature withdrawn from the lower accumulator US. Such a withdrawal of water of different temperatures from the lower accumulator US during charging is rendered possible, if this latter be so charged during the previous working of the turbine T, that its temperature distribution in a charged state guarantees the desired range of temperature in the evaporators when it is discharging.

Figure 11:
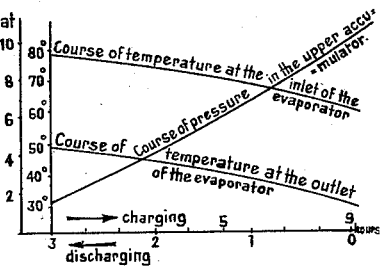
Fig. 11 shows curves illustrating the relation between the course of the temperature at the inlet and outlet respectively of an evaporator and the course of pressure in the upper accumulator during charging and discharging respectively.
Figure 12:
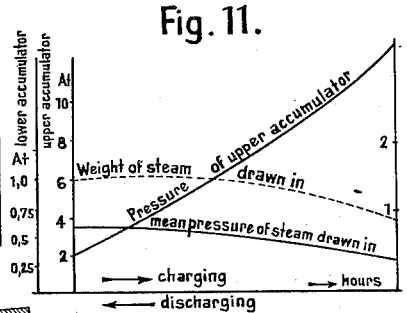
Fig. 12 shows curves illustrating relations between the course of the pressures in the upper and lower accumulators and the weights drawn in by the compresssor.

When the lower accumulator is constructed as a displacement accumulator, the latter method can only be employed without interfering with the principle of displacement, if the water flowing in at the top during the charging of the accumulator becomes continuously hotter, so that during the discharge of the lower accumulator, water which continuously becomes colder, will flow in the opposite direction at the top. The curves in Fig. 11 illustrate such a course of the water temperature in connection with the course of pressure in the upper accumulator. It will be seen that whilst during the charging period the pressure of the upper accumulator is increasing, the temperatures of the water, supplied to and abstracted from the evaporators, are lowered, so as to reduce in the above-mentioned manner the weight of steam absorbed by the compressor. This is illustrated by the curves shown in Fig. 12. During the discharging period pressure and temperature change in the reverse order. There are however cases where it is desirable to adjust the absorption of power by the compressor to a prescribed curve, for example in such a way that the power remains smaller at the beginning and end of the charging period than during the intervening period. In order to maintain the temperatures of the water contained in the charged lower accumulator necessary for this purpose without intermixture of the different zones of water taking place in the latter, it is advisable to divide up the lower accumulator in a manner hereinafter more fully described, into a number of separate compartments, the contents of which are then used in any desired order of succession during the charging and discharging period. Advantages may also be secured in a corresponding manner for the working of the turbine, the maximum of vacuum being selected by using the coldest water when the need for power is greatest, and a lower vacuum, by using hotter water, when the need for power is small. If necessary, the highest vacuum may be reserved for the end of the discharging period if a large amount of power be still demanded at this time, notwithstanding the lowered pressure in the upper accumulator.

In Figs. 3 and 4 is shown by way of example a constructional form of a lower accumulator subdivided into a number of separate compartments, $e$, $f$, $g$, $h$, $i$, Fig. 3 being a horizontal sectional view of the arrangement and Fig. 4 a vertical section on the line IV—IV of Fig. 3. In each of the compartments, which can be switched on and off separately in any desired order of succession, and which are worked on the displacement principle, the separation therein between the hot and cold water is maintained by a movable partition $k$. The compartments can be switched on and off by means of the separate valves shown at the opposite ends of the accumulator.

This type of lower accumulator may, as shown in Figs. 5 and 6, be housed under the engines C, MG, T and the upper accumulator OS and in the foundations S thereof, whereby a considerable amount of floor space is saved. Furthermore the power required for circulating the water in the lower accumulator circuit is lessened thereby, as a vacuum is created in both the condensers and evaporators, and the water in the lower accumulator is located underneath this apparatus. The working losses which are unavoidable when the lower accumulator is in a higher position, are reduced by this arrangement.

The above described methods for regulating the power absorbed by the compressor demand that the lower accumulator shall be charged in quite a definite manner, that is to say in accordance with the load on the compressor which is to be expected on the subsequent charging of the upper accumulator. In cases in which a regulation of the power contrary to what is expected, appears desirable during the working of the compressor, regulation of the quantity and/or temperature of the water in the lower accumulator may again lead to the object aimed at.

Figure 7:
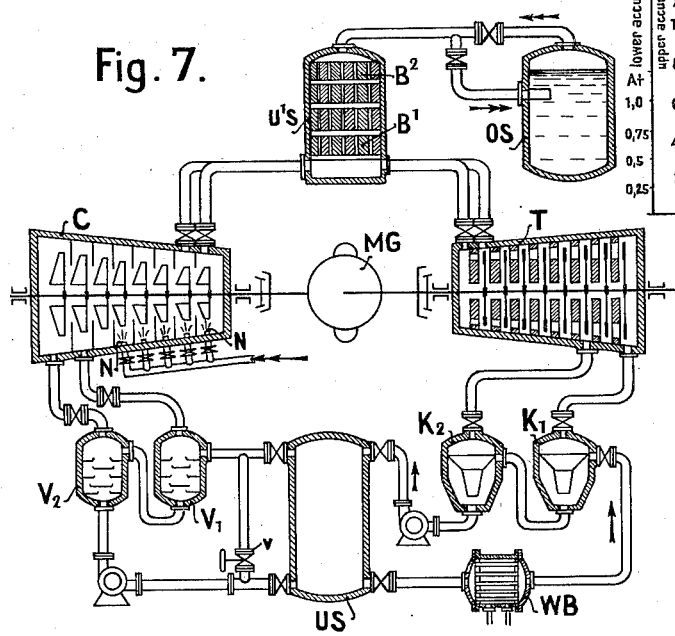
Fig. 7 is a similar plant as shown in Fig. 2 showing another embodiment of the heat exchanger for carrying off the heat produced by losses of energy.

This may be achieved for example, by throttling the quantity of water flowing to the evaporators $V_1$, $V_2$ from the lower accumulator US so that the degree of cooling down in the evaporators is altered and the amount of power taken up by the compressor C consequently regulated within certain limits. According to another method the temperature of the water flowing to the first evaporator $V_1$ can be regulated independently of the temperature of the lower accumulator. This may be accomplished for example as shown in Fig. 7 by partially mixing by means of a valve V cooled down water issuing from the coldest evaporator $V_2$ with the water flowing into the hottest evaporator $V_1$.

In some of the possible methods of regulation hereinbefore described provision was made in the specification for regulating first the temperature only of the water entering the first of the evaporators connected in series. As however this does not unequivocally fix the various temperatures of the several currents of steam drawn in by the compressor from the evaporators, the quantity of the water supplied from the lower accumulator to the various evaporators must also be regulated. If for this purpose the regulating device is influenced for example by the temperature of the water leaving the last evaporator, it will be found to be convenient not to regulate this temperature so that a uniform cooling down of the water from the lower accumulator in the several evaporators always takes place, but, in view of the compressor, in such a way that its wheels work with the best possible efficiency. In this connection, the following in particular must be taken into consideration.

As the work done by a compressor wheel per kilogram of delivery weight of steam for the same point of the pressure-volume curve, at an invariable number of revolutions per unit of time, always remains the same, it follows, in view of the properties of steam, that the increase in the temperature of the saturated steam effected by a wheel, is lower when the suction temperatures are low than when they are high. In addition to this phenomenon, there is also the fact that when the temperature of steam is lowered uniformly in all the suction stages of the compressor the specific volume increases more in the lower suction stages than in the upper ones, which, in accordance with the falling characteristic line of the wheels in centrifugal compressors generally employed results in further reduction in the heat drop overcome by said wheel, that is to say of the temperature of the saturated steam delivered. The difference in temperature between the inlet and outlet from a group of wheels is however positively equal to the difference in the temperature of the evaporators connected to the inlets and outlets of said group of wheels. As in the case in which the first evaporator receives colder water, the total cooling down of the water of the lower accumulator in the evaporators will also be kept lower by regulating the temperature at which it issues from the last evaporator, it follows therefrom that there will also be a reduction in the difference in the temperatures between the inlets and outlets to and from the different groups of wheels. In this way it is possible to operate the groups of wheels during the entire course of the charging period without regard to the temperature of the water flowing to the evaporators, in the vicinity of the point which corresponds to the best efficiency, thus bringing about an improvement in the efficiency of the compressor as well as in that of the whole system.

The temperature of the water issuing from the last evaporator can automatically be regulated by previously fixing its course, in a manner similar to that adopted for regulating the temperature of the water issuing from the lower accumulator. The regulating device R (see Fig. 1) required therefor may be influenced for example from the pressure in the upper accumulator OS, that is to say, from a valve which is dependent on the state of charging of the entire plant at the particular moment.

By determining the quantities of water contained in the lower accumulator the amount of power absorbed by the compressor can also be influenced, the quantity of steam which can be drawn in by the compressor depending on this. Before describing this more fully, the influence of the quantities of water contained in the lower accumulator on efficiency of the entire method will be explained first. Let this quantity be so large e. g. that the water of the lower accumulator cools down from say 60° C. to 40° C. for the prescribed amount of steam to be produced. The compressor, when two evaporators are provided, sucks steam at 50° C. and 40° C. respectively from the evaporators and brings it to the pressure of the upper accumulator. If during the discharging period the lower accumulator be likewise heated up in two steps to 60° C. exhaust steam of 50° C. and 60° C. from the turbine will be necessary for this purpose, even if no jump in temperature between the steam and the hottest water inside the devices $V_1$, $V_2$, acting then as jet condensers be assumed. In this way even in engines in which there is no loss, the work which can be recovered on the expansion of the steam from the pressure of the upper accumulator to the mean temperature of 55° C. will be less than the work of charging, necessary for compressing the same quantity of steam from a mean temperature of 45° C. to the pressure of the upper accumulator. A loss in charging energy of 1% however corresponds to every degree of loss of heat drop at the usual upper accumulator pressures of from 10 to 12 atmospheres, as can be proved mathematically. The loss in charging work will therefore be the greater, the greater the difference in temperature of the water in the lower accumulator between the charged and discharged states, is assumed to be, and, on the other hand will be the smaller the greater the number of devices $V_1$, $V_2$ namely evaporators and condensers, there are connected up in series at the same difference of temperature.

It would therefore appear to be of advantage for the improvement of the efficiency of the method, to make the contents of the accumulators of such dimensions that the difference in the temperatures in the lower accumulator between the charged and discharged states remains small, and furthermore to divide up said difference finely by as many evaporators and condensers as possible.

Whereas the latter step can be carried out to a certain limit only, the former one, even taking the original costs into consideration, can be carried out under all circumstances within tolerably wide limits. It is true that with a falling difference of temperature in the lower accumulator, its volume must be made greater, when the same amount of heat be given off, but on the other hand by improving the efficiency of the method, the much higher cost of the upper accumulator is so much reduced that the total cost, for example where the pressure in the upper accumulator is from 10 to 12 atmospheres, and for a difference of temperature in the lower accumulator of 15° C., is nearly the same as for differences of 20° C., 30° C., 40° C., or even 50° C. with the same mean temperature of the lower accumulator.

By reason of these points of view the contents of the upper accumulator of such a plant would therefore be so determined that the differences of temperature in the lower accumulator will remain small, certainly below 20° C., as in such case a greater degree of efficiency and no increased original cost will be incurred. As previously stated even by a reduction of this difference from 20° C. to 10° C. an improvement of efficiency of 2.5% in round numbers will be obtained in the case of four-stage intake, whilst for two-stage intake even 5% can be obtained. If the evaporators and condensers be suitably arranged barometrically this gain is by no means nullified by the increased work of circulation of the water in the lower accumulator.

If these effects of the dimensioning of the lower accumulator on the efficiency of the method be ignored and if on the other hand the effect of the selection of the quantities of water and temperatures in the lower accumulators on the dimensions and the capacity of the compressor be taken into consideration, other advantageous results will be arrived at. It must be remembered in particular that for a given suction-volume of steam per wheel, which determines the dimensions and the cost of the compressor in a decisive manner, the weights which can be drawn in are increased by increasing the difference in temperature in the lower accumulator. This is shown by the curves in Figs. 9 and 10, wherein the ordinates show in dependence on the difference of temperatures (abscissæ) of the lower accumulator the weight of steam which is possible for a compressor to deal with for various mean temperatures of the absorbed steam. The curves in Fig. 9 hold good for drawing in in two stages, and those in Fig. 10 for four stages. They are based on the following assumptions:

(1) the maximum delivery volume of a compressor wheel amounts to 1 cbm. per unit of time.

(2) the total difference of temperature of the lower accumulator is uniformly divided up by the separate evaporator stages.

A uniform subdivision of the total difference of temperature over the several evaporating stages, yields equal wheel numbers of the corresponding groups of wheels in the compressor, which, in view of the dimensions of the compressor and the total degree of efficiency of the method, is desirable.

The rise of the characteristic lines in Figs. 9 and 10 within the range of slight difference in temperature, is the result of the slight differences of temperature bringing about slight differences in the specific volume of the steam absorbed in different currents so that the greatest volume of steam has to be dealt with in the topmost suction stage of the compressor, which takes in, in common, all the different currents. On the other hand, the decreasing course of these curves which follows when the maximum has been exceeded in the range of greater differences in temperature, happens because large temperature rises in the lower accumulator also have as a result, great differences of temperature in the separate stages, and that under these circumstances the reduction in volume owing to the compression in one stage becomes greater than would correspond to the increase in weight owing to the absorption of the next current of steam by the following stage. The capacity for absorption will therefore be limited at large rises of temperature substantially by the lower stages, which have to deliver the steam at the lowest pressure. The maxima capacities for absorption are located in that range in which the reduction in volume is about equal to its increase due to the steam absorbed by the following stage from the evaporator connected thereto.

The curves show, for two-stage intake, a pronounced maxima in the vicinity of 30° C., for four-stage intake, one in the vicinity of 40° C. For five stages still higher maximum values would be reached.

If the total difference in temperature be not uniformly subdivided by the evaporating stages, it is possible, under certain circumstances, also to obtain an increase of the total weight of the steam absorbed up to about 15% as can be proved mathematically. The character of the curves shown in Figs. 9 and 10 is not however changed by this.

As the cost of the compressor constitutes a considerable part of the total cost of a thermodynamic storage plant, it is accordingly more economical, taking into consideration the total original cost of installation, to make the contents of the lower accumulator of such a size that the differences of temperature between the charged and discharged states, remain greater than 20° C.

As already stated, in carrying out the above described method some of the energy supplied is converted into heat by friction and other causes, which heat is termed "loss heat" in this specification. Were this loss heat to remain inside the system described, it would not be possible to carry out the method repeatedly, and it is therefore necessary to take steps for its removal.

This may be done by allowing a portion of the steam being dealt with to expand to the temperature of the surrounding neighbourhood, which lies below the level of the temperature in the lower accumulator, and by condensing this steam by means of cooling water whereby the latter carries off a quantity of heat equal to the loss heat. This step may also be utilized for increasing the output of the prime mover by supplying steam to the part AT of the turbine (see Fig. 1), such an additional part of the turbine permits of the main turbine T being made of smaller dimensions than otherwise for a given plant. The part AT can be put out of use in a simple manner by shutting off the supply of cooling water to the special condenser OK.

Instead of withdrawing the loss heat in a special condenser connected to the turbine as described, it may also be carried off at any point in the cycle of the lower accumulator water, as is shown in Figs. 2 and 7. Separate devices $V_1$, $V_2$ and $K_1$, $K_2$ are provided for the evaporation and condensation respectively of the working steam. In the arrangement shown in Fig. 7 the removal of the loss heat takes place in a heat exchanger WB during the working period of the turbine T whilst in the arrangement shown in Fig. 2 it is removed by means of the heat during the working period of the compressor. In both these methods, the loss heat is also withdrawn from the plant at a point the temperature of which is lower than the highest temperature in the lower accumulator US and thus increases the thermal drop which can be utilized in the turbine.

In order to obtain equilibrium between the loss heat produced and carried off, the quantity of cooling water in the heat exchangers must be controlled by regulating it during the working of the plant.

I claim:

1. A thermodynamic process for the storage and utilization of energy, consisting in forcing water contained in a lower accumulator through a first circuit, evaporating a portion of the water in this circuit, compressing and simultaneously superheating the steam thus obtained, accumulating the superheat of said steam, condensing afterwards the steam in upper accumulators during the charging period, withdrawing steam from said upper accumulators during the discharging period, superheating such withdrawn steam by means of said stored up superheat and expanding the same for the generation of power, condensing the expanded steam, transmitting heat of condensation hereby obtained to water of the lower accumulator circulated through a second circuit, eliminating from the process the heat produced by losses of energy inherent to the process, and regulating the temperature of the steam produced in said first circuit.

2. A thermodynamic process for the storage and utilization of energy, consisting in forcing water contained in a lower accumulator through a first circuit, evaporating a portion of the water in this circuit, compressing and simultaneously superheating the steam thus obtained, accumulating the superheat of said steam, condensing afterwards the steam in upper accumulators during the charging period, withdrawing steam from said upper accumulators during the discharging period, superheating such withdrawn steam by means of said stored up superheat and expanding the same for the generation of power, condensing the expanded steam, transmitting heat of condensation hereby obtained to water of the lower accumulator circulated through a second circuit, eliminating from the process the heat produced by losses of energy inherent to the process, and regulating the temperature of the steam produced in said first circuit by circulating the water of the lower accumulator several times through said first circuit, whilst the circulation of such water through said second circuit is effected once or a number of times.

3. A thermodynamic process for the storage and utilization of energy, consisting in forcing water contained in a lower accumulator through a first circuit, evaporating a portion of the water in this circuit, compressing and simultaneously superheating the steam thus obtained, accumulating the superheat of said steam, condensing afterwards the steam in upper accumulators during the charging period, withdrawing steam from said upper accumulators during the discharging period, superheating such withdrawn steam by means of said stored up superheat and expanding the same for the generation of power, condensing the expanded steam, transmitting heat of condensation hereby obtained to water of the lower accumulator circulated through a second circuit, eliminating from the process the heat produced by losses of energy inherent to the process, and regulating the temperature of the steam produced in said first circuit by varying the quantity of water which is circulated from the lower accumulator through said second circuit in such a way that a predetermined range of temperatures of the water supplied to the said first circuit is arrived at.

4. A thermodynamic process for the storage and utilization of energy, consisting in forcing water contained in a lower accumulator through a first circuit, evaporating a portion of the water in this circuit, compressing and simultaneously superheating the steam thus obtained, accumulating the superheat of said steam, condensing afterwards the steam in upper accumulators during the charging period, withdrawing steam from said upper accumulators during the discharging period, superheating such withdrawn steam by means of said stored up superheat and expanding the same for the generation of power, condensing the expanded steam, transmitting heat of condensation hereby obtained to water of the lower accumulator circulated through a second circuit, eliminating from the process the heat produced by losses of energy inherent to the process, and regulating the temperature of the steam produced in said first circuit by varying the quantity of water circulated from the lower accumulator through said first circuit.

5. A thermodynamic process for the storage and utilization of energy, consisting in forcing water contained in a lower accumulator through a first circuit, evaporating a portion of the water in this circuit, compressing and simultaneously superheating the steam thus obtained, accumulating the superheat of said steam, condensing afterwards the steam in upper accumulators during the charging period, withdrawing steam from said upper accumulators during the discharging period, superheating such withdrawn steam by means of said stored up superheat and expanding the same for the generation of power condensing the expanded steam, transmitting heat of condensation hereby obtained to water of the lower accumulator circulated through a second circuit, eliminating from the process the heat produced by losses of energy inherent to the process, and regulating the temperature of the steam produced in said first circuit by mixing with the water of said first circuit, previous to its partial evaporation, water having a different temperature.

6. A thermodynamic process for the storage and utilization of energy, consisting in forcing water contained in a lower accumulator through a first circuit, evaporating a portion of the water in this circuit, compressing and simultaneously superheating the steam thus obtained, accumulating the superheat of said steam, condensing afterwards the steam in upper accumulators during the charging period, withdrawing steam from said upper accumulators during the discharging period, superheating such withdrawn steam by means of said stored up superheat and expanding the same for the generation of power, condensing the expanded steam, transmitting heat of condensation hereby obtained to water of the lower accumulator circulated through a second circuit, eliminating from the process the heat produced by losses of energy inherent to the process, and regulating the temperature of the steam produced in said first circuit by mixing water of said first circuit, which has been cooled down owing to said evaporation, with warmer water of said first circuit.

7. A plant for the storage and utilization of energy, comprising a lower accumulator containing water, evaporating means connected to said accumulator, means for forcing the water of the lower accumulator through said evaporating means, a heat pump connected to said evaporating means and generating in the latter a vacuum so that a portion of the water contained therein is caused to evaporate, the steam thus generated being compressed and simultaneously superheated in said heat pump, means for regulating the temperatures of the steam drawn into the heat pump, a superheating accumulator to which the steam delivered by the heat pump gives up its superheat, an upper accumulator working on the drop principle and connected to said superheating accumulator, the steam leaving the latter being condensed in said upper accumulator during the charging period, a prime mover in which is expanded the steam that is produced in the upper accumulator during the discharging period and which steam is superheated on its way through the superheating accumulator, condensers connected as well to said prime mover as to said lower accumulator, means for forcing the water of the lower accumulator through said condensers, at least a portion of the exhaust steam of said prime mover being condensed in these condensers, and means adapted to eliminate from the plant a quantity of heat corresponding to the heat produced in the plant by losses of energy inherent to the process carried out in the plant.

8. A plant for the storage and utilization of energy, comprising a lower accumulator filled with water and working on the displacement principle, evaporators connected to said accumulators, means for forcing the water of the lower accumulator through said evaporators, a heat pump having several inlets and connected to said evaporators in which it generates a vacuum so that a portion of the water contained therein is caused to evaporate, the lower accumulator being large enough to ensure a difference of more than 20° C. in the temperatures of the water contained in this accumulator between the charged and discharged states, a superheating accumulator to which the steam drawn in by the heat pump and highly compressed and simultaneously superheated therein gives up most of its superheat, an upper accumulator working on the drop principle and connected to said superheating accumulator, the steam leaving the latter being condensed in said upper accumulator during the charging period, a prime mover in which is expanded the steam that is produced in the upper accumulator during the discharging period and which steam is superheated on its way through the superheating accumulator, condensers connected as well to said prime mover as to said lower accumulator, means for forcing the water of the lower accumulator through said condensers, at least a portion of the exhaust steam of said prime mover being condensed in these condensers, and means adapted to eliminate from the plant a quantity of heat corresponding to the heat produced in the plant by losses of energy inherent to the process carried out in the plant.

9. A plant for the storage and utilization of energy, comprising a lower accumulator containing water and subdivided into a number of compartments separated one from another, evaporators connected to the lower accumulator, means for circulating the water of the lower accumulator through said evaporators, a heat pump connected to said evaporators and generating in the latter a vacuum so that a portion of the water contained therein is caused to evaporate, such steam being compressed and simultaneously connected to the heat pump and in which the steam superheated in the latter gives up most of its superheat, upper accumulators connected to said superheating accumulator and working on the drop principle, the steam leaving the superheating accumulator being condensed in said upper accumulators during the charging period, a prime mover in which is expanded the steam that is generated in the upper accumulator during the discharging period and which steam is superheated on its way through the superheating accumulator, condensers connected as well to said prime mover as to said lower accumulator, means for forcing the water of the lower accumulator through said condensers, at least a portion of the exhaust steam of said prime mover being condensed in said condensers, means for eliminating from the plant a quantity of heat corresponding to the heat produced in the plant by losses of energy inherent to the process carried out in the plant, and means for connecting the said evaporators and condensers to said compartments of the lower accumulator in any desired consecutive order during the charging and discharging periods.

10. A plant for the storage and utilization of energy, comprising a lower accumulator containing water, evaporators connected to said accumulator, means for circulating the water of the lower accumulator through said evaporators, a heat pump connected to said evaporators and generating in the latter a vacuum so that a portion of the water contained therein is caused to evaporate, such steam being compressed and simultaneously superheated in said heat pump, means for varying the temperature of the steam before it is drawn into the heat pump, means for varying the degree of the superheat of the steam whilst the latter is being compressed, a superheating accumulator to which the steam delivered by the heat pump gives up its superheat, an upper accumulator working on the drop principle and connected to said superheating accumulator, the steam leaving the latter being condensed in said upper accumulator during the charging period, a prime mover in which is expanded the steam that is produced in the upper accumulator during the discharging period and which steam is superheated on its way through the superheating accumulator, condensers connected as well to said prime mover as to said lower accumulator, means for forcing the water of the lower accumulator through said condensers, at least a portion of the exhaust steam of said prime mover being condensed in these condensers, and means adapted to eliminate from the plant a quantity of heat corresponding to the heat produced in the plant by losses of energy inherent to the process carried out in the plant.

11. A plant for the storage and utilization of energy, comprising a lower accumulator containing water and working on the displacement principle, evaporators connected to said accumulator, means for circulating the water of the lower accumulators through said evaporators, a multistage compressor having several inlets, said compressor being connected to said evaporators and generating in the latter a vacuum so that a portion of the water contained therein is caused to evaporate, such steam being compressed and simultaneously superheated in said compressor, means for varying the temperature of the steam before it is drawn into the compressor, means for injecting cooling water into the stages of the compressor in order to cool the steam, said means allowing of varying the quantity of water injected and therefore the degree of superheat generated in the compressor, a superheating accumulator to which the steam delivered by the said compressor gives up its superheat, an upper accumulator working on the drop principle and connected to said superheating accumulator, the steam leaving the latter being condensed in said upper accumulator during the charging period, a prime mover in which is expanded the steam that is produced in the upper accumulator during the discharging period and which steam is superheated on its way through the superheating accumulator, condensers connected as well to said prime mover as to said lower accumulator, means for forcing the water of the lower accumulator through said condensers, at least a portion of the exhaust steam of said prime mover being condensed in these condensers, and means adapted to eliminate from the plant a quantity of heat corresponding to the heat produced in the plant by losses of energy inherent to the process carried out in the plant.

12. A plant for the storage and utilization of energy, comprising a lower accumulator containing water, evaporating means connected to said accumulator, means for forcing the water of the lower accumulator through said evaporating means, a heat pump connected to said evaporating means and generating in the latter a vacuum so that a portion of the water contained therein is caused to evaporate, the steam thus generated being compressed and simultaneously superheated in said heat pump, means for regulating the temperatures of the steam drawn into the heat pump, a superheating accumulator to which the steam delivered by the heat pump gives up its superheat, an upper accumulator working on the drop principle and connected to said superheating accumulator, the steam leaving the latter being condensed in said upper accumulator during the charging period, a prime mover in which is expanded the steam that is generated in the upper accumulator during the discharging period and which steam is superheated on its way through the superheating accumulator, condensers arranged in series and connected as well to said prime mover as to the lower accumulator, means for circulating the water of the lower accumulator through said condensers in order to condense in the latter the exhaust steam of the prime mover, additional means, for expanding steam, to be connected, when required, to said prime mover for further expanding steam exhausted from this prime mover, and a special condenser for condensing the steam exhausted from said additional means and in which condenser a quantity of heat is eliminated by its cooling water from the process, said eliminated quantity of heat corresponding to that produced by losses of energy inherent to the process carried out in the plant.

13. A plant for the storage and utilization of energy, comprising a lower accumulator containing water, evaporating means connected to said accumulator, means for forcing the water of the lower accumulator through said evaporating means, a heat pump connected to said evaporating means and generating in the latter a vacuum so that a portion of the water contained therein is caused to evaporate, the steam thus generated being compressed and simultaneously superheated in said heat pump, means for regulating the temperatures of the steam drawn into the heat pump, a superheating accumulator to which the steam delivered by the heat pump gives up its superheat, an upper accumulator working on the drop principle and connected to said superheating accumulator, the steam leaving the latter being condensed in said upper accumulator during the charging period, a prime mover in which is expanded the steam that is generated in the upper accumulator during the discharging period and which steam is superheated on its way through the superheating accumulator, condensers arranged in series and connected as well to said prime mover as to the lower accumulator, means for circulating the water of the lower accumulator through said condensers, the exhaust steam of said prime mover being condensed in said condensers, and a heat exchanger arranged in one of the circuits through which water of the lower accumulator is circulated, a quantity of heat being eliminated in said heat exchanger which corresponds to the heat produced by losses of energy inherent to the process carried out in the plant.

FRITZ MARGUERRE.